United States Patent [19]

Matsushita

[11] 4,444,944

[45] Apr. 24, 1984

[54] THERMALLY CONDUCTIVE SILICONE RUBBER COMPOSITION

[75] Inventor: Takao Matsushita, Kisarazu, Japan

[73] Assignee: Toray Silicone Company, Ltd., Tokyo, Japan

[21] Appl. No.: 503,919

[22] Filed: Jun. 13, 1983

[30] Foreign Application Priority Data

Jun. 14, 1982 [JP] Japan ................................. 57-101897

[51] Int. Cl.$^3$ ................................................ C08K 3/22
[52] U.S. Cl. ..................................... 524/786; 524/862
[58] Field of Search ................ 524/437, 430, 786, 862

[56] References Cited

U.S. PATENT DOCUMENTS 3,957,713  5/1976  Jeram et al. .......................... 524/786
4,216,140  8/1980  Simizu ................................. 524/786

*Primary Examiner*—Lewis T. Jacobs
*Attorney, Agent, or Firm*—Roger H. Borrousch

[57] ABSTRACT

A thermally conductive silicone rubber composition is prepared by mixing an aliphatically unsaturated polyorganosiloxane, a polyorganohydrogensiloxane, alumina powder having an average particle size of $2\mu$ to $10\mu$ and an oil absorption of $>15$ mL/g, and a platinum-group compound catalyst.

5 Claims, No Drawings

THERMALLY CONDUCTIVE SILICONE RUBBER COMPOSITION

BACKGROUND OF THE INVENTION

1. Field of the Invention

This invention relates to thermally conductive silicone rubber compositions.

2. Description of the Prior Art

Heat-producing electronic components such as power transistors or thyristors generate heat in their operation with the result that their properties deteriorate over long periods due to the generation of heat and they occasionally fail. Conventionally, an insulating and radiating sheet is attached to a heat-producing electronic component to provide for the radiation of the heat generated or the electronic component is potted with a thermally conductive material. When a heat-fixer roll of a copy machine is made of the above-mentioned thermally conductive material, a sufficiently high temperature can be maintained at the roll surface even when the interior section (heated section) of the roll is at a low temperature. This is an advantage of a thermally conductive material.

Thermally conductive silicone rubber compositions may be used in a variety of applications as discussed above. Various types of thermally conductive silicone rubber compositions have been proposed to date. A typical example is an organoperoxide-vulcanized silicone rubber which is blended with aluminum oxide, beryllium oxide, hydrated aluminum oxide, or magnesium oxide as described in Japanese Kokai Pat. No. 55-22891.

However, such a thermally conductive silicone rubber composition is nonfluid and in solid form and therefore cannot be used as a potting material. Also, it is blended with high shearing force with a large amount of filler using a roll or Banbury mixer with the result that the blender is significantly abraded, resulting in a hindrance to the operation. This is a conventional drawback.

Another example is a radiating silicone rubber composition in which the principal components are a polydiorganosiloxane containing at least two vinyl groups per molecule, a polyorganohydrogensiloxane, a platinum compound, and fillers as described in Japanese Kokai Pat. No. 56-2349 published Jan. 12, 1981, to T. Endo. Alumina is cited as the filler in this patent. However, when attempting to mix a large amount of the usual alumina with a fluid silicone rubber composition, dispersion is poor or significant abrasion of the mixing equipment occurs with the result that the fluid silicone rubber composition becomes blackish. This results in poor external appearance on the part of the product. Moreover, it suffers from the drawback that the thermal conductivity can not be significantly improved even with the addition of a large quantity of alumina.

SUMMARY OF THE INVENTION

Various methods were examined by the inventors in order to develop a thermally conductive silicone rubber composition which would not exhibit the conventional drawbacks or problems. This invention was thus developed as a result.

This invention relates to a thermally conductive silicone rubber composition consisting essentially of (a) 100 parts by weight of a polyorganosiloxane having a viscosity at 25° C. of from 0.1 to 100 Pa·s and having an average unit formula

wherein each R represents a monovalent hydrocarbon radical free of aliphatic unsaturation or a halogenated monovalent hydrocarbon radical free of aliphatic unsaturation, each R' represents a monovalent aliphatically unsaturated hydrocarbon radical, a has a value from 1.90 to 2.05, b has a value from 0.0005 to 0.1, and the sum of a+b has a value from 1.91 to 2.06, (b) a polyorganohydrogensiloxane having a viscosity at 25° C. of 0.0007 to 5 Pa·s and having an average unit formula

wherein R is defined above, the sum of c+d has a value of 1.001 to 3, there is at least two silicon-bonded hydrogen atoms per molecule, and said polyorganohydrogensiloxane is present in an amount such that there are 0.5 to 10 equivalents of silicon-bonded hydrogen atoms per equivalent of aliphatically unsaturated hydrocarbon radical in (a), (c) from 100 to 500 parts by weight of alumina powder having an average particle size of $2\mu$ to $10\mu$ and an oil absorption of $\geq 15$ mL/g, and (d) a catalytic quantity of a platinum-group compound as a catalyst.

DETAILED DESCRIPTION OF THE INVENTION

Component (a) is crosslinked with component (b) in the presence of component (d) as a catalyst to form an elastomer. Examples of the silicon-bonded R in the average unit formula are monovalent hydrocarbon radicals such as alkyl radicals, such as methyl, ethyl, propyl, butyl, octyl, and cyclohexyl; aryl radicals such as phenyl and tolyl and halogenated monovalent hydrocarbon radicals such as halogenated alkyl radicals such as 3-chloropropyl and 3,3,3-trifluoropropyl. Examples of R' are monovalent aliphatically unsaturated hydrocarbon radicals such as vinyl, allyl, and 3-butenyl. The silicon atoms of this component may be bonded to extremely small amounts of other subsituents such as hydroxyl and alkoxy in addition to R and R'. Example of siloxane units comprising this component are RR'SiO$_{2/2}$, R$_2$SiO$_{2/2}$, RSiO$_{3/2}$, R'SiO$_{3/2}$, R$_2$R'SiO$_\frac{1}{2}$, RR$_2$'SiO$_\frac{1}{2}$, and SiO$_{4/2}$. The molecular configuration of this component is usually straight chain; however, it may be partially branched. The aliphatically unsaturated hydrocarbon radicals of R' may be present at the molecular chain ends or as side chains or at both locations. These R' are preferably present at the terminals from the standpoints of improved postcure mechanical properties. In a single molecule, R and R' may each consist of a single type or may each consist of a mixture of two or more types. The polyorganosiloxanes of this composition may comprise a single type or a mixture of two or more types. Both the crosslinking density which can be varied by appropriately varying the mixing ratio of relatively low viscous polyorganosiloxane and relatively high viscous polyorganosiloxane and the quantity of inorganic filler are appropriately selected to satisfy the hardness specified for the cured silicone rubber. The desired product hardness can thus be advantageously obtained. The viscosity of the polyorganosiloxane, regardless of whether it is a single type or a mixture of two or more types, is usually 0.1 to 100 Pa·s and preferable 0.2 to 50 Pa·s on average at 25° C.

Component (b) plays the role of crosslinking agent for component (a). Examples of the R groups directly bonded to silicon in this component are the same as for the R groups of component (a) and the R groups may be identical to the R groups of component (a). Examples of the siloxane units constituting this component are $RHSiO_{2/2}$, $R_2SiO_{2/2}$, $RSiO_{3/2}$, $HSiO_{3/2}$, $R_3SiO_{\frac{1}{2}}$, $R_2HSiO_{\frac{1}{2}}$, and $SiO_{4/2}$.

This polyorganohydrogensiloxane may take the form of a straight chain, branched chain, network, or ring; however, a straight chain or ring is preferred. The R groups in each molecule may be a single type or a mixture of two or more types. The polyorganohydrogensiloxane may be single type or a mixture of two or more types. The silicon-bonded hydrogen atoms may be located at the molecular chain ends or along the chain or at both of these two locations. In order to cure component (a), the quantity of silicon-bonded hydrogen atoms must be 0.5 to 10 equivalents per 1 equivalent of the aliphatically unsaturated hydrocarbon radical of component (a). The viscosity of component (b) is 0.0007 to 5 Pa·s at 25° C.

The alumina powder comprising component (c) is expressed by the chemical formula $Al_2O_3$ and is indispensable for imparting a high thermal conductivity and moderate viscosity and thickness to the silicone rubber composition of this invention. This alumina should have an average particle size of from $2.0\mu$ to $10\mu$ and an oil absorption of $\geq 15$ mL/g. The oil absorption is the value measure by the method of JIS K5101. When the average particle size is less than $2.0\mu$, the particles will aggregate with each other at low shearing forces with the result that they disperse into component (a) or (b) upon mixing with component (a) or (b) to form foreign inclusions and cause a poor external appearance. Moreover, the thermal conductivity will not be significantly increased further with an increase in the quantity of addition of alumina. Although the aggregated state can be eliminated and a homogeneous dispersion can be obtained by kneading the mixture of component (a) or (b) and alumina on a three-roll, the kneading equipment will be abraded by the alumina so that the silicone rubber composition becomes blackish. This is a problem.

On the other hand, when the average particle size exceeds $10\mu$, the particles will seldom aggregate with each other and will exhibit good dispersibility. However, the alumina will settle and phase separation will occur after the fluid silicone rubber composition has been allowed to stand for a long period of time.

When the oil absorption is less than 15 mL/g, the silicone rubber composition will not exhibit a satisfactory thermal conductivity.

When the average particle size is in the range of $2.0\mu$ to $10\mu$ and the oil absorption is $\geq 15$ mL/g, the alumina can be uniformly mixed and dispersed into component (a) or (b) even at low shearing forces. The fluid silicone rubber composition will not appear blackish (caused by abrasion of the mixing equipment) and phase separation will not occur. Thus, the fluid silicone rubber composition which contains a relatively small amount of alumina will exhibit a high thermal conductivity.

The alumina mentioned above can be produced by grinding and pulverizing the $\alpha$-alumina produced by the calcination of aluminum hydroxide at elevated temperatures.

The quantity of addition is 100 to 500 parts by weight and preferable 200 to 350 parts by weight per 100 parts by weight of component (a). When this quantity is less than 100 parts by weight, the resulting radiating sheet does not exhibit an adequate thermal conductivity. On the other hand, when the above-mentioned quantity exceed 500 parts by weight, the resulting silicone rubber composition does not exhibit a satisfactory fluidity and, moreover, the vulcanized silicone rubber sheet suffers from degraded mechanical properties.

The platinum-group compound catalyst to be used by the method of this invention as component (d) is a catalyst for the addition reaction of the silicon-bonded aliphatically unsaturated hydrocarbon radicals in component (a) with the silicon-bonded hydrogen atoms of component (b). The platinum-group compound as defined in this text is the individual platinum group metal and its compounds. It includes extremely fine platinum powder, extremely fine platinum powder adsorbed on a carbon powder carrier, chloroplatinic acid, alcohol-modified products of chloroplatinic acid, platinum chelates, chloroplatinic acid-olefin coordination products, chloroplatinic acid-vinylsiloxane coordination products, and similar metal compounds of palladium, rhodium, iridium, ruthenium, and osmium. Of these catalysts, platinum compound catalysts are preferred. The quantity of addition of platinum-group compound catalyst is 1 to 800 ppm as platinum-group metal based on the combined quantities of components (a) to (c).

The thermally conductive silicone rubber composition can be produced by blending the above-mentioned four components (a), (b), (c), and (d) to homogeneity. The mixer to be employed is any type as long as it can hold and mix the powder and the liquid. A kneader mixer or roll mixer is preferred because contents are agitated and mixed under relatively low shearing forces. Because a mixture of components (a), (b), and (d) immediately begins to cure as soon as these components are mixed with each other, these three components should be mixed with each other immediately before molding. An addition-reaction inhibitor such as an organonitrogen compound, acetylene compound, or tin compound may be added to the above-mentioned composition to suppress the above-mentioned curing reaction to prolong the pot life and provide for easy handling of the composition. As necessary, an additional thermally conductive filler such as zinc oxide, and boron nitride and other materials such as fine quartz powder, reinforcing silica fillers, heat stabilizers, flame retardants, organic solvents, or pigments can be added.

Because the thermally conductive silicone rubber composition of this invention exhibits fluidity and rapid curability, it is easily molded and its external appearance is good. The fluidity and rapid curability, it is easily molded and its external appearance is good. The molded product exhibits excellent thermal conductivity and is very useful as a material for an electric insulating and thermally radiating rubber sheet, as the covering material for the heated roll of a copier and as a coating, potting, or sealing material for heat-producing devices.

The thermally conductive silicone rubber composition of this invention can be cured by standing at room temperature for a long period of time or by heating. When the composition is cured at an elevated temperature, both the reaction temperature and time are not critical. However, when the composition is molded in a metal mold under elevated pressures, the reaction conditions to be employed are a reaction temperature of 100° to 200° C. and a reaction time of 20 seconds to 20 minutes. When the composition is vulcanized with hot air under ambient pressure, the reaction conditions to be employed are a reaction temperature of 250° to 450° C. and a reaction time of several seconds to several tens of seconds.

This invention will be explained using demonstrational examples. "Parts" in the example denotes "parts by weight". The physical properties such as the viscosity were always measured at 25° C.

The oil absorption was measured by the method of JIS K5101. The viscosity was measured using a BH rotary viscometer. The external appearance was inspected with the unaided eye. The hardness, tensile strength, elongation, tear strength, volume resistivity, and breakdown strength were measured by the methods of JIS K6301. The thermal conductivity was measured (Shotherm by Showa Denko Company, Ltd.) for a 10 mm thick silicone rubber molded plate.

EXAMPLE 1

120 parts of a methylphenylvinylsilyl-terminated dimethylsiloxane-methylvinylsiloxane-methylphenyl-siloxane copolymer (siloxane unit monomer molar ratio 94.7:0.3:5.0 respectively dimethylsiloxane units: methylvinylsiloxane units: methylphenylsiloxane units; viscosity, 10 Pa·s) was combined with 250 parts $\alpha$-alumina (2.2$\mu$ average particle size and oil absorption of 26 mL/g), 1.5 parts tetramethyltetrahydrogencyclotetrasiloxane as the crosslinking agent, choroplatinic acid ($H_2PtCl_6 \cdot 6H_2O$, 11 ppm platinum based on the whole quantity), and 0.06 part benzotriazole as the addition-reaction inhibitor. The resulting mixture was blended in a planetary-motion compounding rotary mixer for 60 minutes to obtain a fluid silicone rubber composition with a viscosity of 1,200 Pa·s.

The $\alpha$-alumina was uniformly dispersed in this composition and secondary aggregation was absent. A blackish phenomenon due to mixer abrasion was not observed. This fluid silicone rubber composition was allowed to stand for 168 hours; however, the $\alpha$-alumina was not observed to settle.

For a comparison example, a fluid silicone rubber composition was produced by a method identical to the above with the exception that an $\alpha$-alumina with an average particle size of 1.9$\mu$ and an oil absorption of 10 mL/g was used instead of the above-mentioned $\alpha$-alumina.

A fluid silicone rubber composition (Comparison Example 1) produced from an $\alpha$-alumina with an average particle size of 1.9$\mu$ and an oil absorption of 13 mL/g exhibited a viscosity of 900 Pa·s and suffered from secondary aggregation (aggregate size, about 90 to 100$\mu$) of a large amount of alumina which caused a poor external appearance. This composition was passed twice through a three-roll to eliminate almost all the secondarily aggregated $\alpha$-alumina while the fluid silicone rubber composition became blackish due to abrasion of both the roll and blade.

A fluid silicone rubber composition (Comparison Example 2) produced from an $\alpha$-alumina with an average particle size of 12$\mu$ and an oil absorption of 10 mL/g exhibited a viscosity of 750 Pa·s and seldom suffered from secondary aggregation of the $\alpha$-alumina while the fluid silicone rubber composition did become blackish due to abrasion of both the stirring blade and the wall of the apparatus. This fluid silicone rubber composition was allowed to stand for 168 hours with the result that a relatively large amount of $\alpha$-alumina settled to the bottom of the container.

These fluid silicone rubber compositions were press molded and vulcanized at 150° C. for 5 minutes into 2.0 mm thick silicone rubber sheets. The silicone rubber compositions were also press molded and vulcanized at 150° C. for 10 minutes into 10 mm thick silicone rubber molded plates. The properties of the resulting molded products are shown in Table 1 (a 10 mm thick silicone rubber molded plate was used for the thermal conductivity measurement).

TABLE 1

|  | This Invention | Comparison Example 1 | Comparison Example 2 |
|---|---|---|---|
| Alpha-alumina, average particle size (microns) | 2.2 | 1.9 | 12 |
| oil absorption (mL/g) | 26 | 13 | 10 |
| Hardness | 54 | 51 | 48 |
| Tensile strength (kg/cm$^2$) | 28 | 23 | 19 |
| Elongation (%) | 93 | 105 | 78 |
| Tear strength (kg/cm) | 8 | 10 | 6 |
| Volume resistivity (ohm-cm) | $1.8 \times 10^{14}$ | $2.1 \times 10^{14}$ | $1.9 \times 10^{14}$ |
| Breakdown strength (kV/mm) | 24 | 25 | 21 |
| Thermal conductivity (cal/cm-sec-°C.) | $1.7 \times 10^{-3}$ | $1.2 \times 10^{-3}$ | $1.1 \times 10^{-3}$ |

EXAMPLES 2-5

Dimethylvinylsilyl terminated polydimethylsiloxane (120 parts: vinyl group content, 0.2 wt%; viscosity, 3 Pa·s), fumed silica (20 parts; BET surface area, 200 m$^2$/g; surface hydrophobed with polydimethylsiloxane) as reinforcing filler, a polymethylhydrogensiloxane (4.0 parts; viscosity, 0.004 Pa·s) as the crosslinking agent with the general formula

$(CH_3)_3SiO\{(CH_3)HSiO\}_5\{(CH_3)_2SiO\}_3Si(CH_3)_3$, methylvinylsiloxane-chloroplatinic acid complex (20 ppm platinum based on the entire quantity) as the addition-reaction catalyst, and 3-methylbutynol-1 as the addition-reaction inhibitor were placed in a kneader mixer. The contents were mixed to homogeneity to obtain a base compound. The resulting base compound was combined with a $\alpha$-aluminas specified in Table 2 and then kneaded for 60 minutes in order to obtain fluid silicone rubber compositions. The resulting compositions were press molded and vulcanized at 150° C. for 5 minutes into 2 mm thick silicone rubber sheets. The compositions were also press molded and vulcanized at 150° C. for 10 minutes into 10 mm thick silicone rubber molded plates.

The viscosities of the fluid silicone rubber compositions and their external appearance as well as the properties of the cured product are reported in Table 2 (the 10 mm thick silicone rubber molded product was used for the thermal conductivity measurement).

TABLE 2

|  | Invention | | | | Comparison Example | | | |
|---|---|---|---|---|---|---|---|---|
|  | 2 | 3 | 4 | 5 | 3 | 4 | 5 | 6 |
| Fluid silicone rubber | | | | | | | | |

TABLE 2-continued

|  | Invention | | | | Comparison Example | | | |
|---|---|---|---|---|---|---|---|---|
|  | 2 | 3 | 4 | 5 | 3 | 4 | 5 | 6 |
| composition |  |  |  |  |  |  |  |  |
| base (parts) | 100 | 100 | 100 | 100 | 100 | 100 | 100 | 100 |
| alpha-alumina |  |  |  |  |  |  |  |  |
| quantity (parts) | 250 | 300 | 250 | 250 | 250 | 300 | 250 | 250 |
| average particle size (microns) | 2.2 | 2.2 | 4.0 | 8.0 | 1.9 | 1.9 | 0.5 | 12 |
| oil absorption (mL/g) | 26 | 26 | 20 | 18 | 13 | 13 | 18 | 10 |
| External appearance secondary aggregation | no | no | no | no | yes | yes | yes | no |
| blackishness due to mixer abrasion | no | no | no | no | no | no | no | yes |
| Postcure properties |  |  |  |  |  |  |  |  |
| Hardness | 72 | 74 | 71 | 70 | 71 | 75 | 71 | 66 |
| Tensile strength (kg/cm$^2$) | 49 | 40 | 40 | 38 | 35 | 33 | 32 | 28 |
| Elongation (%) | 80 | 75 | 100 | 95 | 85 | 70 | 80 | 85 |
| Tear strength (kg/cm) | 10 | 10 | 10 | 9 | 9 | 9 | 7 | 7 |
| Volume resistivity (ohm-cm × 10$^{-14}$) | 6.0 | 6.2 | 1.3 | 1.0 | 2.0 | 3.0 | 8.0 | 1.8 |
| Breakdown strength (kV/mm) | 28 | 29 | 27 | 26 | 26 | 27 | 26 | 25 |
| Thermal conductivity (cal/cm-sec-°C. × 10$^3$) | 2.5 | 3.0 | 2.3 | 2.1 | 1.9 | 2.3 | 2.0 | 1.8 |

EXAMPLE 6

A fluid silicone rubber composition and then a silicone rubber sheet and silicone rubber molded plate were produced by the methods of Example 1 with the exception that dimethylvinylsilyl terminated polymethyl(3,3,3-trifluoropropyl)siloxane (viscosity, 10 Pa·s) was used instead of the dimethylsiloxane-methylvinylsiloxane-methylphenylsiloxane copolymer of Example 1. This fluid silicone rubber composition exhibited a viscosity of 2,000 Pa·s, but did not suffer from secondary aggregation of the α-alumina or the blackish phenomenon due to abrasion of the mixer. The properties of the cured product were as follows: hardness 57, tensile strength 23 kg/cm$^2$, elongation 97%, tear strength 7 kg/cm, volume resistivity 1.2×10$^{14}$ Ω-cm, breakdown strength 21 kV/mm and thermal conductivity 1.6×10$^{-3}$ cal/cm·sec·°C.

That which is claimed:

1. A thermally conductive silicone rubber composition consisting essentially of
   (a) 100 parts by weight of a polyorganosiloxane having a viscosity at 25° C. of from 0.1 to 100 Pa·s and having an average unit formula $$R_a R_b' SiO_{(4-a-b)/2}$$

wherein each R represents a monovalent hydrocarbon radical free of aliphatic unsaturation or a halogenated monovalent hydrocarbon radical free of aliphatic unsaturation, each R' represents a monovalent aliphatically unsaturated hydrocarbon radical, a has a value from 1.90 to 2.05, b has a value from 0.0005 to 0.1, and the sum of a+b has a value from 1.91 to 2.06,
   (b) a polyorganohydrogensiloxane having a viscosity at 25° C. of 0.0007 to 5 Pa·s and having an average unit formula $$R_c H_d SiO_{(4-c-d)/2}$$

wherein R is defined above, the sum of c+d has a value of 1.001 to 3, there is at least two silicon-bonded hydrogen atoms per molecule, and said polyorganohydrogensiloxane is present in an amount such that there are 0.5 to 10 equivalents of silicon-bonded hydrogen atoms per equivalent of aliphatically unsaturated hydrocarbon radical in (a),
   (c) from 100 to 500 parts by weight of alumina powder having an average particle size of 2μ to 10μ and an oil absorption of ≧15 mL/g, and
   (d) a catalytic quantity of a platinum-group compound as a catalyst.

2. The composition according to claim 1 in which the polyorganosiloxane of (a) has viscosity in the range of 0.2 to 50 Pa·s, the alumina powder is present in an amount of 200 to 350 parts by weight, and (d) is a platinum-compound and is present in an amount such that the platinum metal is 1 to 800 ppm based on (a), (b), and (c).

3. The composition according to claim 2 in which the polyorganosiloxane of (a) is a methylphenylvinylsilyl terminated copolymer of dimethylsiloxane units, methylvinylsiloxane units, and methylphenylsiloxane units.

4. The composition according to claim 2 in which the polyorganosiloxane of (a) is a dimethylvinylsilyl terminated copolymer of dimethylsiloxane units and methylvinylsiloxane units.

5. The composition according to claim 2 in which the polyorganosiloxane of (a) is a dimethylvinylsilyl terminated polymethyl(3,3,3-trifluoropropyl)siloxane.

* * * * *

UNITED STATES PATENT AND TRADEMARK OFFICE
CERTIFICATE OF CORRECTION

PATENT NO. : 4,444,944

DATED : April 24, 1984

INVENTOR(S) : Takao Matsushita

It is certified that error appears in the above-identified patent and that said Letters Patent is hereby corrected as shown below:

In column 4, line 2, "preferable" should read -- preferably --.

In column 4, lines 54-55, "The fluidity and rapid curability, it is easily molded and its external appearance is good." should be deleted.

The following letters should be in italics or underscored with a single line:

In column 2, line 10, the "a" before "has".
In column 2, line 11, the "b" before "has".
In column 2, line 12, the "a" and "b" in "a+b".
In column 2, line 18, the "c" and "d" in "c+d".
In column 7, line 58, the "a" before "has".
In column 7, line 58, the "b" before "has".
In column 7, line 59, the "a" and "b" in "a+b".
In column 8, line 29, the "c" and "d" in "c+d".

Signed and Sealed this

Nineteenth Day of March 1985

[SEAL]

Attest:

DONALD J. QUIGG

*Attesting Officer*  *Acting Commissioner of Patents and Trademarks*